United States Patent Office 3,637,897
Patented Jan. 25, 1972

3,637,897
PROCESS FOR PRODUCING LINEAR
ALPHA OLEFINS
Neville L. Cull, Baker, and Roby Bearden, Jr., and Joseph K. Mertzweiller, Baton Rouge, La., assignors to Esso Research and Engineering Company, Linden, N.J.
No Drawing. Filed Mar. 3, 1969, Ser. No. 804,006
Int. Cl. C07c 3/10
U.S. Cl. 260—683.15 D          5 Claims

ABSTRACT OF THE DISCLOSURE

An improved process for catalytic polymerization, or oligomerization, of ethylene to obtain a reaction product mixture consisting essentially of $C_4$ to $C_{200}$ olefins, including especially linear alpha olefins. The oligomerization reaction is conducted by adding ethylene to a diluent at pressures to maintain an ethylene concentraiton in the liquid phase sufficient to suppress copolymerization reactions involving the product olefins. It is found that higher catalyst activity and stability can be maintained if the transition metal halide and organo aluminum halide catalytic mixture is modified, prior to initiation of the reaction, with a strong Lewis acid (or agent which will generate such acid in situ), added in small but effective critical concentrations. Modification of the catalytic mixture also permits operation at temperatures ranging, e.g., about 20 to 60 centigrade degrees higher than permitted by use of an unmodified catalyst and hence refrigeration needs are reduced, or eliminated.

Traditionally, ethylene is polymerized at selective conditions in the presence of catalytic complexes formed from mixtures consisting of transition metal halides and organo aluminum compounds to yield various products. High molecular weight, high density polymers are formed in the presence of these insoluble Ziegler type catalyst complexes produced, e.g., by reaction between titanium tetrachloride and aluminum triethyl. A characteristic of such reactions is that in the formation of the resultant insoluble catalytic complex, the titanium metal is reduced to a metal having a valence of 3 or below.

Oligomers which have entirely different properties due, in part, to the very limited molecular weight, have also been prepared. The catalyst complexes used for conducting oligomerization reactions are an entirely different complex and the reaction apparently proceeds by a different mechanism. For example, wherein product molecular weight varies inversely with temperature in the reduced titanium catalyst system, it varies directly with temperature in the oligomerization catalyst system. The reactants used in the formation of these oligomerization catalyst complexes include transition metal halides and also organo aluminum halide compounds, added together in specified concentrations, to produce a soluble complex wherein the titanium metal of the complex is unreduced. $TiCl_4$ can thus be reacted with $AlEt_2Cl$ to produce a soluble covalent complex or perhaps an ion pair wherein the titanium metal is unreduced, or has a 4+ valence in accordance with the following formulae:

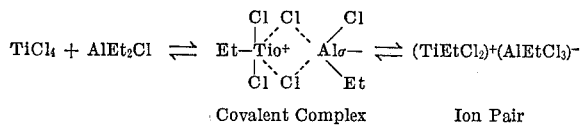

In the formula, Et represents the ethyl group. The $\sigma+$ and $\sigma-$ signs represent, respectively, the centers of low and high electron density in the complex. In the ion pair representation, the $\sigma$ signs (indicating partial development) are omitted to indicate a more fully developed ionic character.

In forming such oligomerization catalysts, the reactants are premixed in the polymerization diluent at conditions selected to optimize olgomerization catalyst formation, while discouraging formation of the insoluble Ziegler type catalysts. When ethylene is added to a solution of the oligomerization catalytic complex, at appropriate conditions, oligomers, especially Type I or linear alpha olefins, ranging in average molecular weight from about 70 to about 600 are selectively formed. In fact, linear alpha olefins can be selectively formed in very high concentrations to the virtual exclusion of Type II (RCH=CHR), Type III ($R_2C$=CHR, and Type IV ($R_2C$=CHR olefins.

The present invention is also a process for the production of predominantly $C_4$ to $C_{200}$ olefins, especially linear alpha olefins of number average molecular weight ranging from about 70 to about 600 for the total product.

Briefly, this invention relates to polymerizing and ethylene-containing gas in the presence of a catalyst comprising the reaction product of a titanium compound, said compound being one selected from the group consisting of $TiX_4$, $TiX_3OR'$, $TiX_3OOCR'$ wherein X is selected from the group consisting of chlorine and bromine and R' is one selected from the group consisting of alkyl, aryl, aralkyl and cycloalkyl and an aluminum alkyl compound such that the ultimate formula of the aluminium alkyl is $$AlR_nX_{3-n}$$

wherein R is selected from the group consisting of alkyl, aralkyl and cycloalkyl and X' is one selected from the group consisting of chlorine, bromine and iodine and $n$ is less than 2 in the presence of a diluent and at a temperature less than 75° C. and a pressure above 100 p.s.i.a., where said temperature and pressure is sufficient to maintain a critical mole ratio of ethylene to product olefins of greater than 0.8 mole, the improvement therewith comprising the step of adding to the catalytic mixture a modifier, said modifier being a Lewis acid containing a metal portion wherein said metal portion is selected from Groups VI-B, VII-B and VIII of the Periodic Table of the Elements in a sufficient amount to increase the activity and stability of the catalyst. The Lewis acid is added, incorporated or generated in situ within the catalytic mixtures in relatively small, critical concentrations, sufficient to alter, to some extent, the character of the soluble complex. The change is manifested by increased activity and stability, i.e., a lesser tendency to form the insoluble Ziegler polyethylene catalyst. The catalyst thus not only retains its soluble character but, in fact, any tendency for the production of high molecular weight polymers is further suppressed. Use of the modified catalyst also permits higher temperature operation to achieve quality results normally achieved at lower temperatures, and hence refrigeration requirements are reduced or eliminated.

Lewis acids, as is known, are those compounds which possess an unfilled orbital that can accept an electron pair from a donor or base, or one which has the capacity of making such orbital available under the influence of this invention are the strong Lewis acids, particularly those of the metal halide and mixed organo metal halide types; and more particularly those of the Friedel-Crafts catalyst type. The most acidic Lewis acids, where the selected acid is compatible with the system, are the most effective and show the highest degree of activation. The activating strength of the Lewis acids, as metal halides, has been found to correlate quite closely with published relative chloride affinities for Lewis acids in non-aqueous solutions. (See, e.g., Friedel-Crafts and Related Reactions, volume I, General Aspects. Edited by George A. Olah; Interscience Publishers (1963, chapter V.) For example, the activity (i.e., activating influence) of aluminum chloride is greater than the activity of ferric chloride, the latter has greater activity than stannic chloride, stannic chloride shows greater activity than titanium tetrachloride, the latter shows greater activity than boron trichloride, and the activity of boron trichloride is considerably higher than the activity of silicon tetrachloride. Represented symbolically, $AlCl_3 > FeCl_3 > SnCl_4 > TiCl_4 > BCl_3 >> SiCl_4$, which is the same order for the chloride ion affinity series.

The modifier is added to the catalytic mixture and the latter treated for a sufficient time, usually from about one to about thirty minutes to effect the desired modification of the catalyst. Modifiers most useful in the practice of this invention are the metal halides and mixed alkyl metal halides wherein the metal or metalloid portion is selected from Groups II, III–A, IV, V–A, VI–B, VII–B and VIII of the Periodic Table of the Elements. Exemplary of such metals and metalloids are beryllium, magnesium, zinc, boron, aluminum, gallium, indium, thallium, tin, lead, titanium, antimony, zirconium, hafnium, arsenic, antimony bismuth, chromium, molybdenum, tungsten, manganese, technetium, rhenium, iron, cobalt, ruthenium, rhodium, palladium, osmium, and the like. Illustrative of metal halides useful as modifiers are zinc chloride, magnesium chloride, boron tribromide, aluminum chloride, gallium tribromide, indium chloride, thallium chloride, stannous chloride, zirconium tetrabromide, antimony trichloride, antimony pentachloride, bismuth trichloride, ferric chloride, ruthenium tetrachloride, osmium tetrachloride, and the like. Illustrative of suitable alkyl metal halides are ethyl zinc chloride, methyl boron dichloride, ethyl gallium dichloride, methyl indium dichloride, ethyl thallium dichloride, and the like. The utility of diorgano and higher substituted metal halides is marginal, and these must be used with care inasmuch as they can exert a deactivating influence. Exemplary of dialkyl substituted metal halides of some utility are di-n-butyl germanium dichloride, di-isopropyl germanium dibromide, dimethyl tin dchloride, dibutyl tin dibromide, diethyl zirconium dibromide, triethyl antimony dichloride, and the like.

Small amounts of the metals or metalloids per se can also be added to or incorporated within the reaction mixture to modify the catalyst by in situ generation of metal halides or organo metal halides. It has thus been found that small amounts of the metals or metalloids per se of Groups II, III–A, IV, V–A, VI–B, VII–B and VIII can be used to treat the catalyst so that the reduction of the titanium is suppressed or eliminated. The metals can be utilized most effectively in the form of powders, metal filings, turnings or the like.

Metals found particularly effective, in free state, salt or organo substituted salt form, are iron, boron, aluminum, tin, antimony and bismuth. They are especially preferred, however, as metal halide salts, particularly as chlorides.

The mode of modifier addition is important, and post addition of the modifier to the catalyst prior to initiation of the oligomerization reacton s preferred because this suppresses or prevents interference in the formation of the catalyst complex and side reactions are suppressed or avoided. The modifiers are added to a reaction mixture or solvent containing the catalyst in effective concentrations ranging up to about 300 percent, and preferably up to about 100 percent, based on the moles of transition metal halide used in the catalyst preparation. Greater concentrations than necessary to modify the catalyst are undesirable inasmuch as adverse side reactions, e.g., polymerization and isomerization of the product olefins can be produced.

Modifier concentrations as low as 1 mole percent show some effectiveness. Concentrations as low as about 10 mole percent increase the normal catalyst activity as much as three to five-fold. Concentrations of strongly acidic metal halides above about 75 mole percent generally produce some catalyst deactivation at a given polymerization temperature and particularly at temperatures below about 10° C. Concentrations above about 100 mole percent generally produce a very rapid decline in activity.

The polymerization temperature, to some extent, determines the amount of modifier that can be added without causing deactivation of the catalyst. For example, the deactivation encountered at polymerization temperatures of 10° C. or below as a result of modifier concentrations in the range of 100–300 mole percent can be easily reversed by elevating the polymerization temperature to from about 20 to about 60° C. Surprisingly, activity is regained at elevated temperature without loss in selectivity to the Type I olefin product and without formation of significant amounts of unwanted, high molecular weight polyethylene. This behavior contrasts quite sharply with that of the unmodified catalyst which yields large amounts of high molecular weight polyethylene at polymerization temperatures above 20° C. These modified catalyst forms, therefore, can be further utilized if the temperature of the reaction system is elevated beyond that at which deactivation is produced. Inasmuch as the activity, yield, and product quality are approximately the same as exhibited at the lower polymerization temperature, a clear process advantage is gained in that refrigeration requirements are reduced. In general, it has been found most preferable for purposes of activating and stabilizing the catalyst to employ from about 10 to about 35 mole percent of the modifier, especially the more active modifiers, when the polymerization is conducted in polar diluents at temperatures below 10° C., and from about 50 to about 150 mole percent for operations in nonpolar diluents or at temperatures in the range of from about 20 to about 60° C.

The mechanism of the modification is not fully understood, but it is apparent that the addition of the modifier increases the ionic character of the catalyst. It is believed to increase he stability of the ionic form which is most responsible, or perhaps entirely responsible, for formation of oligomers. While Applicants do not wish to be bound by any specific theory, it is believed that the added modifier promotes formation of the ionic catalyst and enhances the ionic (acidic) character of the catalyst. Greater anion solvation (probably through complex anion formation) and modification of the original catalyst, supra, occurs to produce said effects as represented by the following equation:

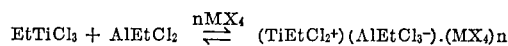

In the formula, $MX_4$ represents a Lewis acid modifier of the metal halide type, M specifically representing a metal and X halogen. The letter $n$ represents the number of moles of modifier employed.

Whatever the mechanism, however, there is a definite response of the original catalyst to the modifier addition, or treatment, and stability of the catalyst and catalyst activity is increased.

An outstanding advantage of this discovery is that the temperature of the reaction system can be elevated from about 20 to about 60 centigrade degrees to attain oligomers of the same average molecular weight range as formerly attained at the lower temperatures without modifier addition. Heretofore, optimum conditions generally favored conducting the reaction at about 0° C. to 10° C., this necessitating high refrigeration requirements. In accordance with the present process, however, the reaction can be conducted at temperatures up to about 75° C. with ordinary cooling water to achieve similar results.

The unmodified catalyst employed in the reaction system is a complex reaction product which is substantially soluble in the polymerization system. The complex is obtained by partially reacting a reducible, heavy transition metal halide, the metallic portion of which is selected from Groups IV–B, VI–B, and VIII, of the Periodic Chart of the Elements, with an aluminum alkyl halide compound such that the ultimate formula of the aluminum alkyl compound is $AlR_nX_{3-n}$, wherein $n$ is less than 2, and preferably less than 1; R is alkyl, cycloalkyl or aralkyl, preferably containing from 1 to about 20 carbon atoms, for example, methyl, ethyl isobutyl, cyclohexyl, benzyl, etc.; and X is chlorine, bromine or iodine. The preferred transition metal used in forming the complex is a titanium compound having a valency of 4, as represented by the formula: $TiX_aA_b$, wherein $a=3$ or 4, $b=0$ or 1, and $a+b=4$, X=chlorine or bromine, and A is chlorine, bromine or an anion derived from a protonic compound such as an alcohol (R'OH) or a carboxylic acid (R'COOH). The R' of the protonic compound can be an alkyl, aryl, aralkyl or cycloalkyl group. The $TiX_aA_b$ component can be made in situ by reacting $TiX_4$ with the protonic compound. Thus, the preferred transition metal component of this invention may be selected from the groups $TiX_4$, $TiX_3OR'$ and $TiX_3OOCR'$. Typical examples of such compounds are $TiCl_4$, $TiBr_4$, $TiX_3OC_2H_5$ and $TiX_3OOCH_3$.

The aluminum alkyl halide component, usually a mixture, is prepared from aluminum alkyl halides of the general formulas $RR'AlX$ and $R''AlX_2$ wherein R, R' and R'' are similar or dissimilar, and thus represent hydrocarbon radicals such as alkyl, cycloalkyl or aralkyl containing, preferably, from 1 to about 20 carbon atoms, and X is a halogen such as chlorine, bromine or iodine.

The molar ratio of alkyl aluminum halides in the mixture and the overall molar ratio of the alkyl aluminum halides to the transition metal halide in the unmodified complex is not critical to this invention as long as the $AlR_nX_{3-n}$ reaction product has the proper formula. The molar ratio of $AlR_nX_{3-n}$ to $TiCl_4$ can be 0.1/1 to 150/1 or more. Catalyst concentration is normally in the range of 0.1 to 10 grams per liter of diluent.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feeds containing minor amounts of other olefins can be used but it must be realized that the copolymerization will, to some extent, decrease product linearity.

The polymerization diluent is a very important feature of this invention insofar as it affects catalyst activity and product molecular weight. Aromatic, halogenated aromatic, aliphatic and naphthenic diluents can all be used satisfactorily. In general, activity decreases and molecular weight increases with decreasing diluent polarity. Thus, the use of modified catalysts, which tend to decrease molecular weight and to boost activity, permits the use of less expensive nonpolar solvents to achieve the same results obtained with polar diluents. Moreover, even liquid ethylene can be used as a solvent. This offers the advantage, in commercial processes, of eliminating the need for solvent recovery systems.

Preferred diluents from a cost effectiveness standpoint are the readily available aliphatic and naphthenic compounds such as butane, isobutane, pentanes, hexanes, heptanes, cyclopentane, methylcyclopentane, cyclohexane and the like. Simple aromatics such as benzene, toluene and xylene are also ideal diluents, with the exception that they can yield olefin alkylation products in the presence of acidic metal halide modifiers, particularly when trace $O_2$ or $H_2O$ contaminates are present. Halogenated aromatics are excellent diluents but are expensive relative to the aliphatic and naphthenic diluents. Less preferred solvents are halogenated aliphatic compounds which, though capable of being employed in the process of preparing linear alpha olefins, require the utilization of higher pressures to achieve average molecular weights of the same order as the preferred solvents. The less desirable halogenated aliphatic diluents include methyl chloride, ethyl chloride, dichloromethane, and the like. Mixed diluents can be used. For example, mixtures of aliphatic or naphthenic diluents with aromatics or haloaromatics can be readily used. The diluent or diluent mixture can be used to some extent to control the product molecular weight distribution to obtain maximum selectivity to the desired olefin products.

The oligomerization reaction must be conducted at sufficient pressure to avoid the formation of highly branched olefins and to obtain linear olefins in high selectivities. Although some variations in pressure are permitted, depending upon the catalyst composition, diluent and temperature, the pressure should be maintained above about 100 p.s.i.g. in order to produce commercially attractive yields (at least above 5 weight percent and preferably above 10 weight percent olefins in the reactor effluent) of linear alpha olefins having a purity greater than about 90 percent. Pressures can range as high as 1000 p.s.i.g., and higher, but at very high ethylene pressures the process may become uneconomical because of the equipment requirements and ethylene recycle. Preferably, the pressure ranges from about 200 p.s.i.g. to about 900 p.s.i.g. of ethylene pressure.

The ratio of moles of ethylene to the moles of product must be above about 0.8 in order to effect the selective synthesis of ethylene to linear olefins. The preferred molar ratio of ethylene to products is above about 5. The upper limit of the mole ratio of ethylene to product must be above 0.8 or the product formed contains more than 10 percent branched chain olefins at product concentrations required to obtain commercially attractive yields.

The process of this invention is carried out at selected conditions of temperature and pressure which will maintain ethylene in the proper mole ratio with the product olefins. Temperature selection permits control of the average molecular weight of the product. Preferably, the reaction can be carried out at temperatures below about $+100°$ C., but more preferably it is carried out at between about 0° C. and about $+50°$ C.

Reaction times are not particularly critical when operating under the preferred conditions and they will normally be in the range of 0.1 to 5 hours to obtain product concentrations greater than 5 percent by weight in the diluent. The process can be carried out in batch or continuous operation. However, high product purity and high concentration are achieved most easily in batch reactions or in continuous systems operating under essentially plug flow.

The oligomerization reaction is not generally carried to completion, but quenched to terminate the reaction at an optimum desired time. After the catalyst has been effectively quenched, e.g., by adding isopropyl alcohol, the residues can be removed from the products in any conventional way, such as washing with water or aqueous caustic, adsorption, ion exchange resins, and the like.

The following demonstration, and illustrative examples, bring out the more salient features of the invention.

EXAMPLES

The following demonstration is illustrative of the experimental procedure used in carrying out ethylene oligomerization without use of a modifier.

Catalyst preparation

Approximately 400 grams of xylene (percolated over alumina and stored over sodium ribbon) was charged to a dry 500 ml. flask equipped with a small side arm, a serum cap, and an adapter to permit charging to an autoclave. Forty-four hundredths ml. of $TiCl_4$ (4 millimoles) were injected into the xylene solvent.

The flask containing the $TiCl_4$-xylene solution was then wrapped in aluminum foil, and the contents cooled to 15° C. by immersion of the flask into a stirred ice-water bath. Then 3.4 ml. of a 20 percent aluminum alkyl mixture in xylene (4 millimoles of aluminum ethyl dichloride and 2 millimoles of aluminum diethyl chloride) were injected into the $TiCl_4$-xylene solution. The resulting solution was treated by stirring for 30 minutes at 15° C.±1° C. The flask was then removed from the ice-water bath, weighed and the contents thereof pressured into a 2-liter Parr autoclave. Weighing the catalyst flask after charging permitted an accurate determination of the weight of catalyst solution charged to the autoclave. Four hundred and nineteen grams of the catalyst, clear and red-orange in color, was charged to the autoclave.

Oligomerization

The oligomerization reaction was carried out in a 2-liter Parr autoclave. The contents of the autoclave were pre-cooled to −25° C. prior to charging the catalyst solution. After the catalyst was added, ethylene (dry and oxygen-free) was pressured into the autoclave. The temperature rose quite rapidly to around 0° C. and was maintained at ±2° C. for one hour. The pressure in the autoclave was maintained at 500 pounds by adding ethylene as needed.

The run was terminated by pressuring in 14.4 grams of isopropanol while the reactor was still under reaction conditions (+2° C., 500 p.s.i.g. ethylene pressure). The quenched product was stirred for approximately 5 minutes and the unreacted ethylene vented off. After all the ethylene had been vented, the autoclave was weighed prior to disassembly to obtain a yield figure. The autoclave was then disassembled and the total product removed. A sample of product was analyzed on a G.C. column to obtain a yield figure and product distribution data. The yield of liquid olefins was 176 grams. The olefin concentration in the reaction mixture was found to be 32.8%.

Product workup

The alcohol quenched product was water-washed using two 500 ml. portions of deionized water. After separating off the water, the amount of higher molecular weight polyethylene was determined by filtration, air drying and finally drying for 1 hour in a vacuum oven at 125° C. and 26″ Hg vacuum. The yield of high molecular weight polyethylene was found to be 1.4 grams or 0.7 percent, based on the weight of olefins. (Polyethylene using unmodified catalyst, under generally similar conditions, has been found to vary as high as 2.0 weight percent, or more.) The filtered liquid product (xylene plus ethylene oligomers) was dried and analyzed using capillary G.C. techniques. Product linearity (weight percent linear alpha olefins in $C_{12}$–$C_{20}$ fraction) was found to be 97.4. The average molecular weight ($\overline{M}n$) of the olefins was determined as 118.

Catalyst modification

An additional series of runs was made wherein the catalyst was treated and modified by post addition of a metal halide or alkyl metal halide to the catalyst prior to conducting the oligomerization reaction. Thus, the catalyst preparation procedure described above was repeated except that the end of the thirty minute treating period following addition of the aluminum alkyl mixture in xylene to the $TiCl_4$-xylene solution, a sufficient amount of the modifier was added to provide 25 mole percent, based on the $TiCl_4$ employed. Oligomerization reactions were then initiated.

The results of all of these runs in terms of activity (grams olefins per gram of $TiCl_4$ reacted per hour) and product quality are as summarized in Table I below:

TABLE I

Standard catalyst: 2 $TiCl_4$, $AlEt_2Cl$, 2 $AlEtCl_2$
Catalyst concentration: 0.02M (excluding modifier)
Metal halide modifier: 25 mole percent on $TiCl_4$. Added after pretreat.
Polymerization: 2° C., 500 p.s.i.g. ethylene

| | | Product quality | | |
|---|---|---|---|---|
| Example Number | Metal halide modifier | Activity, g. olefin/ g. $TiCl_4$/ hr. | Olefin conc., wt. percent in prod. mixture | Average molecular wt. of product | Type I olefin $C_{12}$–$C_{20}$ cut, wt. percent |
| | None | 220 | 32.8 | 118 | 97.4 |
| 1 | $AlCl_3$ | 1,200 | 41.6 | 108 | 97.5 |
| 2 | $FeCl_3$ | 730 | 55.7 | 115 | 96.7 |
| 3 | $SnCl_4$ | 500 | 46.0 | 108 | <50 |
| 4 | $AlBr_3$ | 470 | 41.3 | 110 | 97.0 |
| 5 | $TiCl_4$ | 350 | 38.9 | 113 | 97.3 |
| 6 | $BCl_3$ | 280 | 33.6 | 114 | 97.6 |

From the foregoing data it will be observed that the most acidic halides produce the greatest amount of activation. Olefin product quality, in general, remains very high, and often is improved despite the increased activity.

Activity is not the sole factor in the selection of a modifier, as illustrated, e.g., by reference to Example 3. It is generally desirable to select the most active metal halides for catalyst modifiaction, but it is essential to do so in consideration of the totality of conditions imposed on the system. For example, in the above data it is shown that stannic chloride, a powerful modifier, adversely affects the quantity of Type I olefin produced. This, however, need not be so in all reaction systems or at all conditions. The reason for the deterioration in Type I olefin production is because this particular activator is incompatible with the system at the conditions chosen. Alkylation of the xylene solvent competes with the basic reaction thus lowering product quality.

One method of controlling modifier activity is by the use of substituent groups to form organo metal halides, particularly the alkyl substituted metal halides and more particularly the mono alkyl substituted metal halides. These are useful modifiers in the practice of this invention. Substitution of the halide substituents of the metal halides is desirable, generally, where the aim is to decrease the activity of a particular metal halide species, because substitution decreases the acidity. In certain instances, however, substitution also suppresses side reactions, particularly alkylation of the solvent. Over-substitution, however, can in certain instances convert all or some portion of the catalyst into the conventional Ziegler form and hence increase the yield of high molecular weight polyethylene. Alkyl substituents, particularly in limited number, produce such tendency to a lesser extent than aryl substituents. The alkyl, and particularly the mono alkyl substituted metal halides, is satisfactory because there is little or no tendency to promote formation of the conventional Ziegler-type catalysts and hence to produce the undesired high molecular weight polyethylene.

The following selected data, obtained under the conditions defined for Examples 1 through 6, are illustrative of the use of organo substituted organo metal halides. In Table II below, the activity and average molecular weight of the product obtained by use of various alkylated tin halides is described, a derivative of tin having been selected in view of an adverse effect caused by stannic chloride in the above examples.

TABLE II

Catalyst base: 2 $TiCl_4$, $AlEt_2Cl$, 2 $AlEtCl_2$
Catlyst Conc.: 0.02M in xylene (excluding additive)
Additive conc.: 25 mole percent $TiCl_4$. Added after pretreat.
Polymerization: 2° C., 500 p.s.i.g. $C_2H_4$

| | | | Product quality | | |
|---|---|---|---|---|---|
| Example Number | Organo substituted metal halide modifier | Activity, g. olefin/ g. $TiCl_4$/ hr. | Olefin conc., wt. percent in prod. mixture | Average molecular wt. of product | Type I olefin $C_{12}$–$C_{20}$ cut, wt. percent |
| | None | 220 | 28.4 | 118 | 97.4 |
| 7 | $Sn(C_4H_9)Cl_3$ | 550 | 50.0 | 108 | 96.5 |
| 8 | $Sn(C_2H_5)_2Cl_2$ | 330 | 37.4 | 117 | 98.0 |

It is thus seen that activity and product quality can be controlled by organo substitution of the metal halide modifier.

The following selected data, given in Table III below, demonstrate low temperature deactivation and subsequent higher temperature reactivation techniques in accordance with a practice of this invention.

In obtaining these data, Example 4 was repeated except that 150 mole percent of aluminum bromide was added to produce partial deactivation of the catalyst. As shown, the activity of the modified catalyst increases as the temperature is elevated, and there is relatively little adverse effect in product quality. The catalyst regains activity as polymerization temperature is increased and yields the same excellent quality olefins at ambient temperature as obtained with the normal catalyst at 0° C.

TABLE III

[Catalyst containing 150 mole percent AlBr₃ on TiCl₄]

| Example Number | Run temp., °C | Activity, g. olefin/ g. TiCl₄/hr | Type I olefin ($C_{12}$-$C_2^0$) | Average molecular weight of product |
|---|---|---|---|---|
| 9 | 0 | 190 | 98.0 | 120 |
|   | 17 | 380 | 97.0 | 117 |
|   | 25 | 580 | 96.5 | 116 |

As observed, activity increases rapidly with increasing temperature, product Type I olefin content decreases only slightly with increasing temperature and the average molecular weight of the product remains fairly constant.

The following selected data, given in Table IV below, shows that metal halide modifiers improve catalyst stability. As shown, high molecular weight polyethylene obtained with the unmodified catalyst, particularly at elevated temperatures, is absent in the activated catalyst runs.

As observed, activity increases rapidly with increasing temperature, product Type I olefin content decreases only slightly with increasing temperature and the average molecular weight of the product remains fairly constant.

The following selected data, given in Table IV below, shows that metal halide modifires improve catalyst stability. As shown, high molecular weight polyethylene obtained with the unmodified catalyst, particularly at elevated temperatures, is absent in the activated catalyst runs.

TABLE IV

[Effect of activators on insoluble polymer yields]

| Example Number | Modifier | Mole percent on TiCl₄ | Polymer temp., °C. | Wt. percent high molecular weight polyethylene on total product |
|---|---|---|---|---|
| 10 | None | 0 | −5 | 0.4 |
|   | ...do... | 0 | +2 | 0.7 |
|   | ...do... | 0 | +10 | 1.5 |
|   | AlBr₃ | 150 | 2 | 0 |
|   | AlBr₃ | 150 | 17 | 0 |
|   | AlBr₃ | 150 | 25 | 0 |
|   | AlCl₃ | 7 | 2 | 0 |
|   | FeCl₃ | 10 | 2 | 0 |

It is therefore apparent that the activators effectively stabilize the catalyst against conversion to conventional Ziegler catalyst forms.

The following selected comparative data, Table V, show the results obtained when conducting oligomerization reactions in nonpolar solvents, even ethylene itself.

TABLE V

Basic catalyst composition (millimoles): 4 TiCl₄, 4 AlEtCl₂, 2 AlEtCl₂
Temperature: 0-2° C.
Pressure: 500-550 p.s.i.g.
Time: 60-90 minutes.

| Example Number | Diluent | Metal halide modifier | Activity, g. oligomer/ g. TiCl₄/ hr. | Polyethylene wt. percent on total product | Average molecular weight | Type I olefin $C_{12}$-$C_{20}$ cut, wt. percent |
|---|---|---|---|---|---|---|
|    | Heptane | None | 3.5 | ~50 | ~300 |   |
| 11 | ...do... | 8 mmol TiCl₄ | 68.0 | 0.0 | 150 |   |
| 12 | Ethylene ¹ | ...do... | 175 | 17.0 | 120 | 94.5 |
|    | Xylene ² | None | 170 |   | 118 | 96.0 |
| 13 | Heptane | 4 mmoles SnCl₄ | 27.0 | 0.0 |   | 96 |
| 14 | ...do... | 1.5 mmole AlBr₃ | 80.0 | 0.0 | 141 | 96 |

¹ Under run conditions, the diluent composition was approximately 96% liquid ethylene, 4% xylene (by weight).
² Under run conditions, the approximate diluent composition was 60% liquid ethylene, 40% xylene (by weight).

It is thus shown that the modified catalysts function well in nonpolar diluents, paraffins and even ethylene. This is surprising because the unmodified catalyst is relatively inactive.

Furthermore, it was found that ethylene oligomerization could be conducted in a diluent comprised of approximately 95 percent liquid ethylene, a nonpolar hydrocarbon. The remaining 5 percent of the diluent was xylene and could have been other suitable solvents used for premixing of catalyst components. The catalyst, prepared by reacting TiCl₄ and a mixture of aluminum alkyl halides so that the ultimate alkyl formula is $AlR_nX_{3-n}$ (wherein $n$ is <2 and preferably <1), has been shown to give high molecular weight polyethylene or at best low yields of high average molecular weight oligomers when used in nonpolar diluents.

Surprisingly, also, it was found that catalyst activity and the oligomer product obtained in a predominantly liquid ethylene diluent was comparable to that obtained normally in a predominantly xylene diluent.

The Type I olefin content of the sample prepared in liquid ethylene was lower by only 1.5 weight percent than the sample prepared in xylene. A lower conversion level and a reduction in the excess TiCl₄ can improve the Type I olefin content.

An incentive for use of an ethylene diluent process is that it would eliminate much of the on-site investment required for distillation and recovery of other solvents. Further, the use of liquid ethylene is advantageous in use of a boiling (auto-refrigerated) reactor.

The following selected data, obtained under conditions defined for Examples 1-6, are illustrative of the use of metals to improve catalyst activity and stability.

TABLE VI

Basic catalyst composition (millimoles): 2 TiCl₄, 0.8 AlEt₂Cl, 2 AlEtCl₂
Catalyst concentration: 0.02 M in xylene
Polymerization conditions: 2° C., 500 p.s.i.g. ethylene

| Catalyst prepared in | Activity, g. olefin/g. TiCl₄/hr. | Polyethylene yield, wt. percent of total |
|---|---|---|
| Glass | 153 | 5 |
| Stainless Steel Autoclave | 190 | 1 |
| Glass and carbon steel turnings ¹ | 230 | 1.2 |

¹ (Steel turnings added to xylene diluent prior to TiCl₄ addition.)

The data support the conclusion that traces of iron improve catalyst activity and stability. Judging from the marked activating influence of FeCl₃ (Table I), it is probable that in this case the metal effect, the iron effect, is due to iron chloride formed from trace HCl contamination of the system.

It is readily apparent that various changes and modifications can be made without departing from the spirit and scope of the present invention.

Having described the invention, what is claimed is:

1. In a process for preparing a product of linear alpha olefins having a number average molecular weight ranging from about 70 to about 600 wherein an ethylene-containing gas is polymerized in the presence of a substantially soluble catalyst system formed by mixing components comprising a titanium compound, said titanium compound being one selected from the group consisting of $TiX_4$, $TiX_3OR'$, $TiX_3OOCR'$, wherein X is one selected from the group consisting of chlorine and bromine, and R' is one selected from the group consisting of alkyl, aryl, aralkyl and cycloalkyl and an aluminum alkyl compound such that the ultimate formula of the aluminum alkyl compound is $AlR_nX'_{3-n}$ wherein R is one selected from the group consisting of alkyl, aralkyl and cycloalkyl and X' is one selected from the group consisting of chlorine, bromine and iodine and $n$ is an integer less than 2, in the presence of a diluent and at a temperature less than 75° C. and a pressure above 100 p.s.i.g., wherein the mole ratio of ethylene to the reaction product is maintained above 0.8 moles throughout the reaction and a reaction product is prepared having at least 90 mole percent linear olefins in which the product olefin concentration is greater than 5 weight percent based on the diluent and reaction product, further including the step of adding to the catalytic mixture at least 10 mole percent of a modifier, said modifier being one selected from the group consisting of metal halides and mixed alkyl metal halides wherein the metal portion of said modifier is one selected from the group consisting of chromium, molybdenum, tungsten, manganese, technetium, rhenium, iron, cobalt and ruthenium, whereby the activity and stability of the catalyst is greatly enhanced.

2. The process of claim 1 wherein the metal is iron.

3. The process of claim 1 wherein the modifies is an iron halide.

4. The process of claim 1 wherein the modifier is added to the catalyst concentrations ranging from about 10 mole % to about 75 mole % based on the moles of titanium compound present in the catalyst at temperatures ranging up to about ambient.

5. The process of claim 1 wherein the reaction is conducted at temperatures ranging from about 0° C. to about +50° C., and at pressures ranging from above about 100 p.c.i.g. to about 1000 p.s.i.g.

References Cited
UNITED STATES PATENTS

| | | | |
|---|---|---|---|
| 2,993,942 | 7/1961 | White et al. | 260—683.15 |
| 3,060,162 | 10/1962 | vanden Berg et al. | 252—429 X |
| 3,316,314 | 4/1967 | vanden Berg | 252—429 X |
| 3,441,630 | 4/1969 | Langer et al. | 260—683.15 |
| 3,472,910 | 10/1969 | Favis | 260—683.15 |

PAUL M. COUGHLAN, JR., Primary Examiner

U.S. Cl. X.R.

252—429 C; 260—94.9 E, 671 C